(12) United States Patent
Schuh et al.

(10) Patent No.: US 8,282,746 B2
(45) Date of Patent: Oct. 9, 2012

(54) SUPERELASTIC ALLOY STRUCTURAL GEOMETRY FOR ULTRAHIGH MECHANICAL DAMPING

(75) Inventors: Christopher A. Schuh, Ashland, MA (US); Jose M. San Juan, Bilbao (ES); Ying Chen, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 437 days.

(21) Appl. No.: 12/499,122

(22) Filed: Jul. 8, 2009

(65) Prior Publication Data

US 2010/0140439 A1 Jun. 10, 2010

Related U.S. Application Data

(60) Provisional application No. 61/134,363, filed on Jul. 9, 2008.

(51) Int. Cl.
*C22C 9/01* (2006.01)
(52) U.S. Cl. .................. 148/402; 148/435; 420/486
(58) Field of Classification Search .................. None
See application file for complete search history.

(56) References Cited

U.S. PATENT DOCUMENTS

| | | | |
|---|---|---|---|
| 5,005,678 A | 4/1991 | Julien et al. | |
| 5,842,312 A * | 12/1998 | Krumme et al. | 52/167.1 |
| 5,982,521 A * | 11/1999 | Bessho et al. | 359/198.1 |
| 6,530,664 B2 | 3/2003 | Julien | |
| 2007/0137740 A1* | 6/2007 | Johnson et al. | 148/562 |
| 2009/0025833 A1* | 1/2009 | Schussler | 148/402 |

FOREIGN PATENT DOCUMENTS

CN 101429788 A 5/2009

OTHER PUBLICATIONS

Frick et al., "Loss of pseudoelasticity in nickel-titanium sub-micron compression pillars," Acta Materialia, Vo. 55, pp. 3845-3855, 2007.
Condo et al., Microstructural aspects related to pseudoelastic cycling in ultra fine grained Ni-Ti, Materials Science and Engineering A, V. 481-482, pp. 138-141, 2008.
Cronauer, A comparison of high dampoing shape memory alloys with Cu-Mn-based and Fe-Cr-based alloys, Defense Technical Information Center, retrieved from the internet: URL:http://www.dtic.mil.srch/doc?collection=t3&id=ADA184110, online Jun. 1987.
Demers, "Thermomechanical fatigue of nanostructured Ti-Ni shape memory alloys," Materials Science and Eng. A., V. 513-514, pp. 185-196, 2009.

(Continued)

*Primary Examiner* — George Wyszomierski
(74) *Attorney, Agent, or Firm* — Theresa A. Lober

(57) ABSTRACT

A mechanical structure is provided with a crystalline superelastic alloy that is characterized by an average grain size and that is characterized by a martensitic phase transformation resulting from a mechanical stress input greater than a characteristic first critical stress. A configuration of the superelastic alloy is provided with a geometric structural feature of the alloy that has an extent that is no greater than about 200 micrometers and that is no larger than the average grain size of the alloy. This geometric feature is configured to accept a mechanical stress input.

45 Claims, 9 Drawing Sheets

OTHER PUBLICATIONS

Jacobus et al., Effect of Stress State on the Stress-Induced Martensitic Transformation in Polycrystalline Ni-Ti Alloy, Metallurgical and Materials Trans. A, V. 27A, pp. 3066-3073, Oct. 1996.

Eggeler et al., "Structural and functional fatigue of NiTi shape memory alloys," Materials Science and Eng. A., V. 378, pp. 24-33, 2004.

Huang, On the selection of shape memory alloys for actuators, Materials and Design, V. 23, pp. 11-19, 2002.

Kneissl et al. "Microstructure and Properties of NiTi and CuAlNi Shape Memory Alloys," Metalurgija—Jnl. of Metallurgy, V. 14, pp. 89-100, Jun. 2008.

PCT/US2009/049861, International Search Report, pp. 1-3, and PCT/ISA/210 patent family annex, and Written Opinion of the International Searching Authority, cover sheet, PCT/ISA/237 two pages, and Separate sheets 1-2, May 2010.

Lin et al., "Structure and thermomechanical behavior of NiTiPt shape memory alloy wires," Acta Biomaterialia, V. 5, pp. 257-267, 2009.

European Patent Appl. No. 09 812 429.0, Response to Reply to Written Opinion of the ISR, pp. 1-8, Mar. 2011.

Montecinos et al., Superelastic behavior and damping capacity of CuAlBe alloys, Materials Science and Eng. A, V. 419, pp. 91-97, 2006.

Olbricht et al., "The influence fo temperature on the evolution of functional properties during pseudoelastic cycling of ultra fine grained NiTi," Materials Scitence and Eng. A, V. 481-482, pp. 142-145, 2008.

Demers et al., "Optimization of the cold rolling processing for continuous manufacturing of nanostructured Ti-Ni shape memory alloys," Jnl. Mats. Processing Tech., V. 209, pp. 3096-3105, 2009.

San Juan et al., "Superelasticity and Shape Memory in Micro- and Nanometer-scale Pillars," Adv. Mater., V. 20, pp. 272-278, 2008.

San Juan et al., Nanoscale shape-memory alloys for ultrahigh mechanical damping, nature nanotechnology, V. 4, pp. 415-419, Jul. 2009, online Jun. 7, 2009, with Supplemental Information, pp. 1-12.

Sawaguchi et al., "Crack Initiation and Propagationin 50.9 At. pct NiTi Pseudoelastic Shape-Memory Wires in Bending-Rotation Fatigue," Metall. and Mats. Trans. A, V. 34A, pp. 2847-2860, 2003.

Otsuka et al., Superelasticity effects and stress-induced martensitic transformations in Cu-Al-Ni Alloys, Acta Metallurgica, V. 24, pp. 207-226, 1976.

Brinson et al., "Stress-induced transformation behavior of a polycrystalline NiTi shape memory alloy: micro and macromechanical investigations via in situ optical microscopy," Jnl. Mechanics and Phys. Solids, V. 52, pp. 1549-1571, 2004.

Van Humbeeck et al., "Damping Capacity of thermoelastic martensite in shape memory alloys," Jnl. of Alloys and Compounds, V. 20. 1-2, pp. 58-64, Jun. 2003.

Wu et al., "Damping characteristics of TiNi binary and ternary shape memory alloys," Jnl. of Alloys and Compounds, V. 355, No. 1-2, pp. 72-78, Jun. 2003.

\* cited by examiner

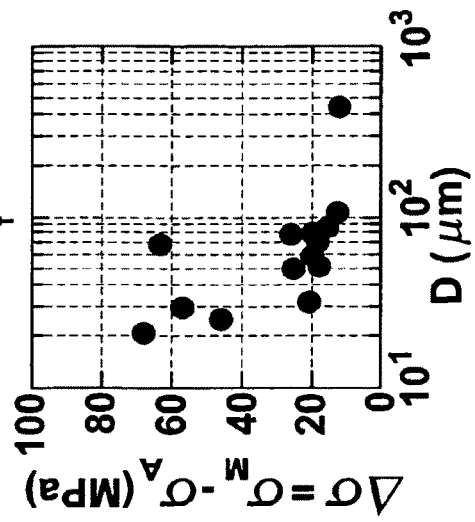
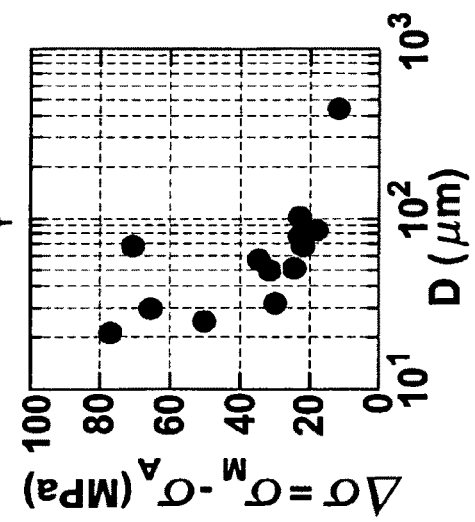
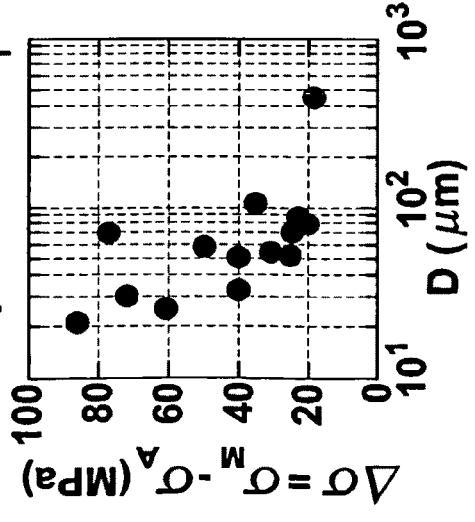
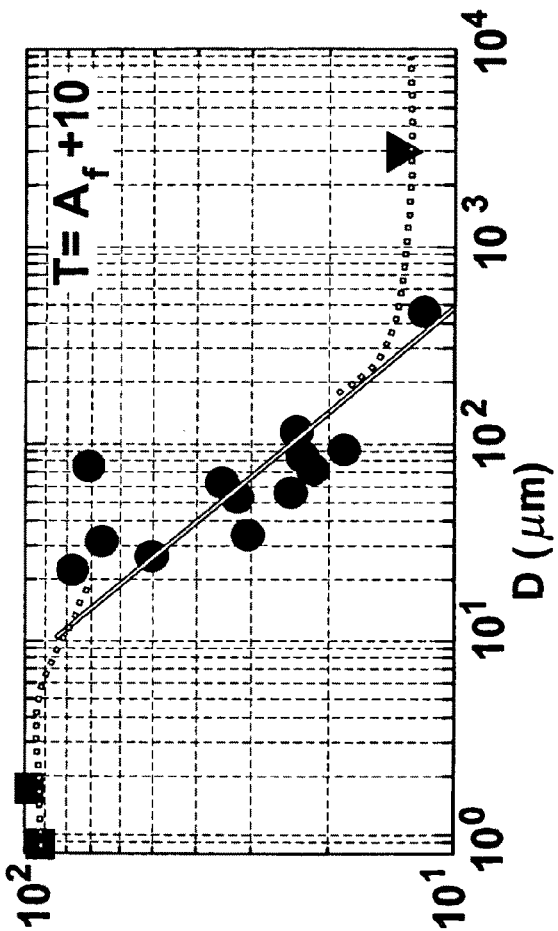
FIG. 8A
FIG. 8B
FIG. 8C
FIG. 8D

US 8,282,746 B2

SUPERELASTIC ALLOY STRUCTURAL GEOMETRY FOR ULTRAHIGH MECHANICAL DAMPING

CROSS-REFERENCE TO RELATED APPLICATIONS

This application claims the benefit of U.S. Provisional Application No. 61/134,363, filed Jul. 9, 2008, the entirety of which is hereby incorporated by reference.

STATEMENT REGARDING FEDERALLY SPONSORED RESEARCH

This invention was made with Government support under Contract No. W911NF-07-D-0004, awarded by the Army Research Office. The Government has certain rights in the invention.

BACKGROUND OF INVENTION

This invention relates generally to methods for suppressing mechanical vibration and mechanical impact shocks, and more particularly relates to materials and structures for suppressing mechanical vibration and impact shocks.

The suppression of mechanical vibration noise and impact shocks by mechanical damping is a widely sought property in materials, not only as a matter of scientific interest, but also to enable new technologies. A wide range of proposed mechanical and electromechanical systems ranging in dimension from the macro-scale to the meso-scale, micro-scale, and even nano-scale, critically rely on at least minimal suppression of vibration and impact shock to maintain integrity of system operation. Indeed, without vibration suppression or mechanical isolation, many complicated mechanical systems can malfunction or be damaged, or demonstrate only suboptimal operational performance.

One class of materials, shape memory alloys (SMAs), have been shown to demonstrate mechanical damping in macro-scale systems. Shape memory alloys undergo reversible transformations between two distinct morphological phases in response to changes in temperature or applied stress. It has been shown in macro-scale SMA structures that the creation and motion of the internal interfaces between these two phases during such transformations dissipates energy, providing mechanical damping of the mechanical system in which a macro-scale SMA structure is employed.

But for many mechanical systems, conventional macro-scale damping structures are not effective or even applicable. For example, improved mechanical damping is presently of interest in micro electromechanical systems (MEMS), which are generally based on microelectronic materials and planar microfabrication technology, and which for many applications are required to mechanically operate for hundreds of millions, or even billions, of mechanical cycles without failure. Such micro-scale systems, as well as nano-scale systems, are not in general amenable to conventional damping structures.

Yet while damping and fatigue characteristics are of paramount importance for MEMS, these properties are often on opposite sides of a trade-off. For example, by packaging a MEMS structure in air or exposed to ambient air, an air squeeze film can be formed that can contribute to damping of spurious mechanical vibrations in the structure or the immediate surroundings. But silicon MEMS structures can fatigue through an oxidation mechanism during air exposure. The resulting oxidation fatigue can be alleviated by vacuum packaging, but this is found to exacerbate the transmission of mechanical shock and noise to MEMS components from their use environment. Endurance against hazardous environmental vibrations is therefore correspondingly reduced by a vacuum package. Thus, one of either structural integrity or mechanical operation performance often must be compromised in favor of the other in advanced sensing and actuating MEMS technologies.

This example demonstrates that for many mechanical systems, across a range of dimensions, mechanical damping requirements can often not be well-addressed without a required compromise in protection against environmental conditions, without limits on operational performance, precision, or reliability, or without prejudicing another consideration in the success of the system. Conventional mechanical damping configurations have heretofore necessitated such compromises and as a result have limited the applications of mechanical systems in the meso-scale, micro-scale, and nano-scale regimes.

SUMMARY OF THE INVENTION

The invention overcomes the limitations of conventional mechanical damping configurations to provide a mechanical damping structure that can be arranged to achieve superior mechanical damping and shock vibration protection. In one aspect of the invention, a mechanical structure is provided with a crystalline superelastic alloy that is characterized by an average grain size and that is characterized by a martensitic phase transformation resulting from a mechanical stress input greater than a characteristic first critical stress. A configuration of the superelastic alloy is provided with a geometric structural feature of the alloy that has an extent that is no greater than about 200 micrometers and that is no larger than the average grain size of the alloy. This geometric feature is configured to accept a mechanical stress input.

With this arrangement, the mechanical structure of the invention enables ultra-high-damping performance characteristics and response times on the order of just a few milliseconds. These qualities provide a practical solution for a new generation of more precise and reliable MEMS and the growing class of nano-scale devices and systems, as well as a wide range of meso-scale and macro-scale systems.

The invention provides a corresponding mechanical damping system that in one aspect of the invention includes a mechanical system and mechanical support through which mechanical stress is input. A mechanical connection is provided, between the mechanical system and the mechanical support, by at least one crystalline superelastic alloy structure having an average grain size and being characterized by a martensitic phase transformation resulting from a mechanical stress input greater than a characteristic first critical stress. A configuration of the superelastic alloy structure provides a geometric structural feature of the alloy including a structural feature having an extent that is no greater than about 200 micrometers and that is no larger than the average grain size. The geometric structural feature is here configured to accept the input mechanical stress.

In a further aspect of the invention a mechanical damping system is provided having a mechanical housing with an input end through which mechanical stress is input and a mechanical support. A mechanical connection is provided between the housing and the support by at least one crystalline superelastic alloy structure having an average grain size and being characterized by a martensitic phase transformation resulting from a mechanical stress input greater than a characteristic first critical stress. A configuration of the superelastic alloy structure provides a geometric structural feature of the alloy including a structural feature having an extent that is no greater than about 200 micrometers and that is no larger than the average grain size of the alloy. The geometric structural feature is configured to accept the input mechanical stress.

Other features and advantages of the invention will be apparent from the following description and accompanying drawings, and from the claims.

DESCRIPTION OF THE DRAWINGS

FIGS. 8A-8C are plots of difference between martensitic critical stress and austenitic critical stress, for thirteen experimental superelastic alloy fibers of the invention, as a function of fiber diameter;

FIG. 8D is a logarithmic plot of the data of FIG. 8B, with the addition of data for the micro-scale pillar for which data is plotted in FIGS. 9A-B and for an additional micro-scale pillar of 1.6 micron-diameter (square symbols), as well as data for a macro-scale wire from the literature (triangular symbol);

DETAILED DESCRIPTION OF THE INVENTION

The invention provides a discovery of a class of superelastic alloy structures having geometric structural feature dimensions that in combination with alloy characteristics produce an unexpected effect whereby at the micro-scale and the nano-scale of geometric features, the alloy structures of the invention can reversibly dissipate more than twice as much mechanical energy as that of corresponding bulk forms, with mechanical damping properties that far exceed the corresponding macro-scale bulk materials and structures. As explained in detail below, this ultrahigh damping that is accomplished by superelastic alloy structures of the invention can be employed in a wide range of applications to suppress mechanical vibration and impact shocks at all of the macro-scale, meso-scale, and micro-scale of mechanical and electromechanical system dimensions.

Superelastic alloys of the invention exhibit a reversible phase transformation and include shape memory alloys such as copper-based alloys, like Cu—Al—Ni alloys, as well as a wide range of other superelastic alloys described below. The basic mechanism by which superelastic alloys of the invention dissipate mechanical energy is through their reversible thermoelastic martensitic transformation, between a high temperature phase, called austenite, and a low temperature phase, called martensite. The transformations between these two phases occur via a rapid shearing of the atomic lattice to produce a corresponding structural shape change.

The austenite-martensite phase transformation can also be induced by the application of mechanical stress to the alloy structure at a constant temperature. It is this mechanical stress-induced phase transformation that is exploited in accordance with the invention for dissipating energy in a superelastic alloy structure.

Figure 1A:
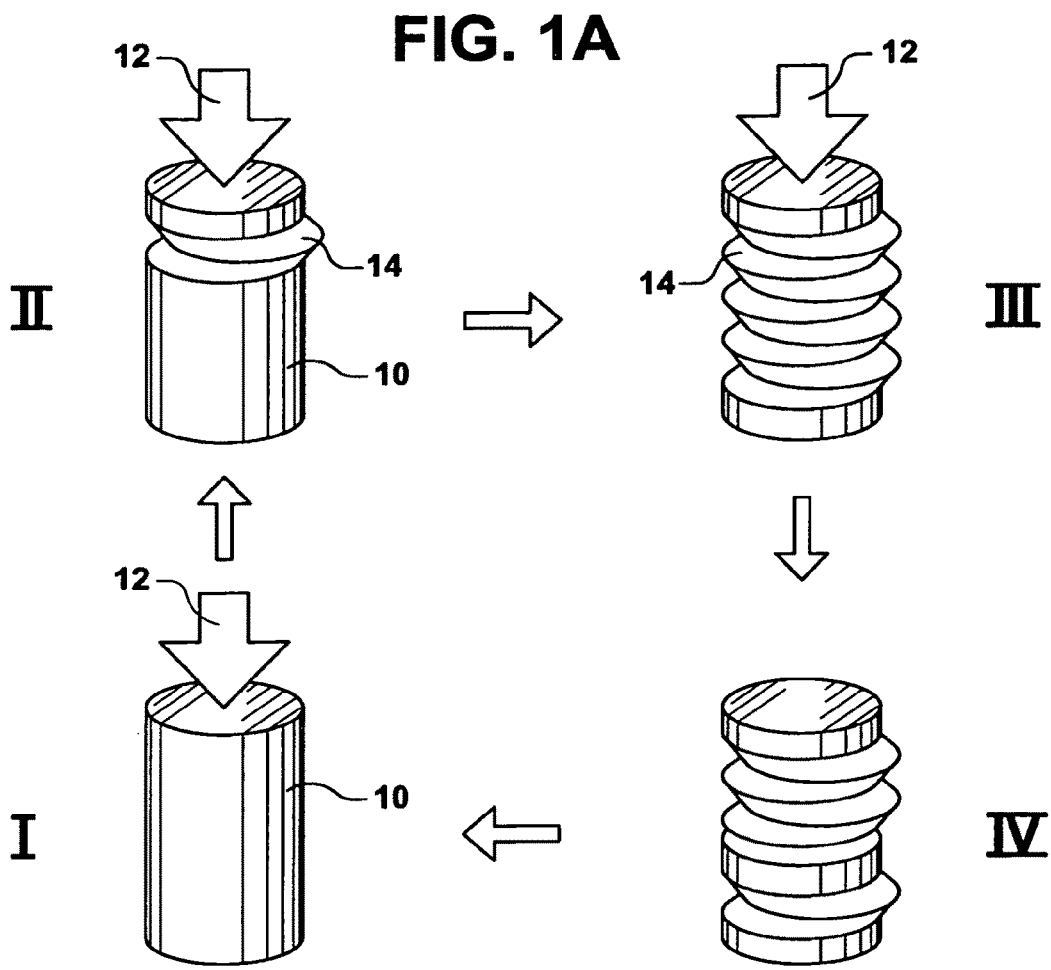
FIG. 1A is a schematic diagram of four states in an austenite-martensite-austenite transformation cycle of a structure of the invention.
Figure 1B:
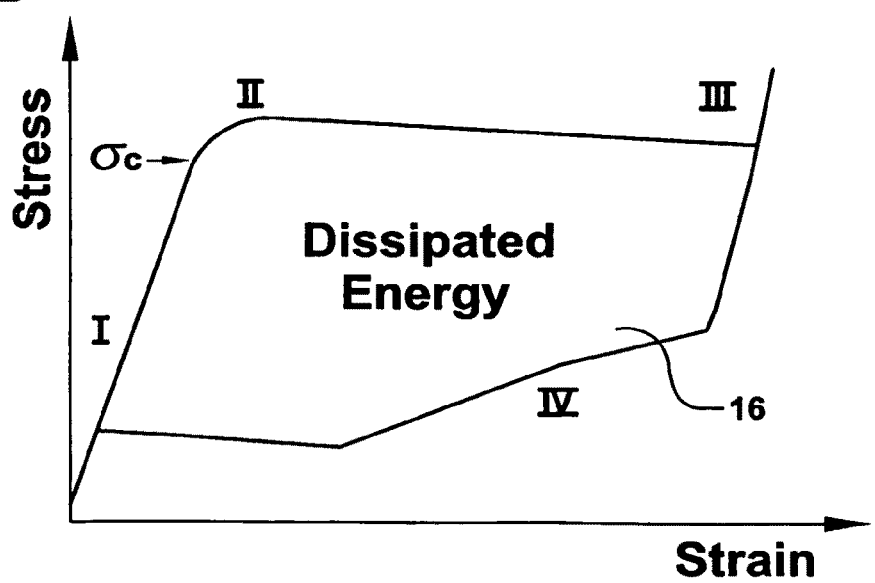
FIG. 1B is a plot of applied stress and correspondingly generated strain for the four states of the transformation cycle depicted in FIG. 1A.

Referring to FIGS. 1A-1B, there is depicted the stages of the austenite-martensite phase transformation cycle for an example pillar structure in accordance with the invention. In FIG. 1A, there is shown a pillar 10 of austenite provided in accordance with the invention in a starting state (I) for elastic deformation. When a mechanical stress 12 is applied to the pillar with sufficient force to exceed a critical stress value, $\sigma_c$, that is characteristic for the combination of the selected pillar material, the pillar structure geometry, and the pillar dimensions, martensite variants 14, that are compatible with the applied stress, are induced within the original austenite phase, as shown at a second state (II) in FIG. 1A, creating martensite-austenite interfaces within the pillar structure.

As shown at a third state (III) in FIG. 1A, the martensite-austenite interfaces are driven to move through the material as the applied stress 12 is maintained, whereby substantially all of the austenite can be transformed to martensite 14. Then, as shown at a fourth state (IV) in FIG. 1A, when the applied stress is reduced, a reverse transformation occurs from martensite to austenite during the mechanical unloading of the pillar. When the stress is completely withdrawn, the pillar recovers to its starting state (I) in FIG. 1A. The reversible nature of this transformation behavior is referred to as superelasticity. The superelastic alloy structure can be cycled through the transformation repeatedly.

FIG. 1B is a generalized plot of applied mechanical stress and the corresponding mechanical strain generated in a structure such as the pillar of FIG. 1A during the reversible phase transformation. The stress-strain plot of such a superelastic alloy displays a characteristic hysteresis loop that corresponds to the loading and unloading of the pillar with an applied mechanical stress. The mechanical strain corresponding to each of the four states of the transformations depicted in FIG. 1A are identified in the plot of FIG. 1B, along with identification of the critical stress value, $\sigma_c$, the application of which causes the large increase in strain between states (II) and (III), when the material shifts from austenite to martensite. As shown in the plot, after unloading, the strain response of the alloy pillar returns to that at the start of the cycle, as an indicator of reversible, repeatable superelastic material properties.

In the austenite-to-martensite-to-austenite transformation cycle depicted in FIG. 1A, the internal phase interfaces of the pillar material, i.e., the interfaces between austenite and martensite phases within the pillar, dissipate a large fraction of the available mechanical energy during their formation and motion. The area 16 inside the hysteresis loop of the plot of FIG. 1B is a quantitative measure of the energy per unit volume that is dissipated by this interface formation and motion in the pillar during the transformation cycle. It is this energy dissipation by the pillar material that provides a mechanism for absorbing shock energy and/or damping mechanical vibrations during the transformation cycle.

It is discovered in accordance with the invention that structures having geometrical feature dimensions specified by the invention and formed of a superelastic alloy of the invention can dissipate an extraordinarily large amount of energy during the superelastic phase transformation, with a mechanical damping merit index that is substantially higher than that of corresponding bulk materials. These characteristics enable the superelastic alloy structures of the invention to be incorporated into macro-scale, micro-scale, and nano-scale systems, and importantly, MEMS and NEMS, as micro- and nano-dampers that enable a new generation of safer and more reliable electromechanical systems for vibration- and shock-sensitive applications. The alloy structures of the invention provide these characteristics passively, i.e., without the need for active control during mechanical actuation or other operation. In the discussion below, there are described the material and structural characteristics and features of the superelastic alloy structures of the invention that are discovered to enable this ultra-high damping property.

First considering a quantitative analysis of the energy dissipated by superelastic alloy structures in accordance with the invention generally, the energy dissipated by phase interfaces during nucleation and motion of the interfaces in the transformation cycle of FIG. 1A can be evaluated based on a stress-strain curve like that of FIG. 1B, here for an example micro-pillar of the invention. For non-linear behavior, as exhibited by superelastic materials such as shape memory alloys, a mechanical damping coefficient, $\Psi$, is defined as $$\Psi = \frac{\Delta W}{W_{max}}, \text{ with } W_{max} = \int_0^{\sigma_{max}} \sigma \cdot d\varepsilon$$

given as the maximum stored mechanical energy per unit volume of material for applied stress, $\sigma$, over the stress-strain cycle, and with $\Delta W = \oint \sigma \cdot d\varepsilon$ given as the area of the hysteresis loop 16 in the plot of FIG. 1B, taken during a stress-strain cycle, which represents the dissipated energy per unit volume of material for the cycle.

In order to compare the results of energy dissipation during the stress-strain cycle of a structure of the invention with damping measurements for a range of structures and materials generally, the loss factor, $\eta$, or mechanical damping coefficient, of the stress-strain cycle, or the internal friction, $\tan(\phi)$, where $\phi$ is the lag phase angle between strain and stress in a stress-strain plot, are preferably used, because the loss factor and internal friction represent the dissipated energy per unit volume. In the current case where only a positive stress-strain cycle is considered the mechanical damping coefficient, $\eta$, can be defined as:

$$\eta = \tan(\phi) = \frac{\Delta W}{\pi \cdot W_{max}}. \tag{1}$$

Conventionally, in structural applications where beams are loaded in bending or columns are loaded in compression, the merit index or figure of merit for a stiffness design, with maximum damping per unit volume, is given by:

$$E^{1/2} \cdot \eta, \tag{2}$$

where E is Young's modulus. It should be noted that for other structure geometries and loading conditions, there are other merit indices of interest, but for the analysis here, the definition above is adequate.

Figure 2:
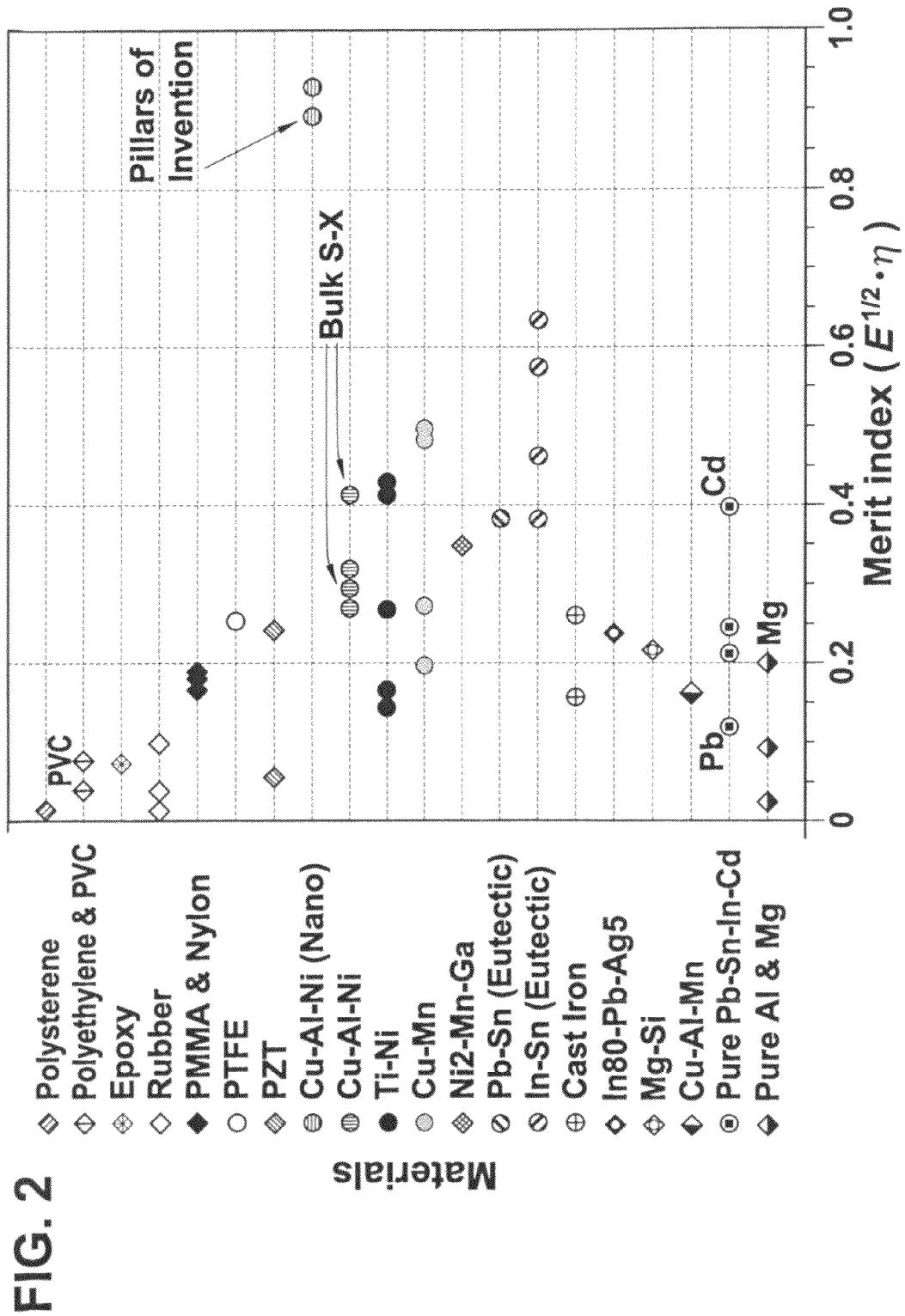
FIG. 2 is a plot of mechanical damping merit index for a range of bulk and macro-scale structures and micro-scale structures of the invention.

FIG. 2 is a plot of this structural damping figure of merit, as defined by Expression (2) above, for a range of materials and structures. To establish a common basis for comparison, all plotted values assume isothermal damping at room temperature or close to room temperature, at a compression frequency of about 1 Hz, in experimental conditions for which no residual deformation remains when withdrawing an applied compression stress. It is seen from the plot of FIG. 2 that among the bulk materials traditionally employed as high-damping materials, Cu—Mn alloys exhibit the highest damping merit index, about 0.5. Below this, there is a group of high-damping materials with damping merit indices around 0.4, including pure Cd, the eutectic alloys In—Sn and Pb—Sn, as well as Ti—Ni bulk shape memory alloys and bulk Cu—Al—Ni single crystals, the characteristics of which were measured using macroscopic compression tests.

As shown in the plot of FIG. 2, two experimental microscale pillars provided in accordance with the invention, as described in detail below, are characterized by a damping merit index of about 0.9, which corresponds to a remarkably high mechanical damping loss factor of $\eta=0.190\pm0.003$. The two experimental micro-scale pillars providing this data were formed with of a Cu—Al—Ni alloy in accordance with the invention, with pillar heights of about 5.3 µm and 3.8 µm and with pillar diameters about ⅓ of pillar height.

The merit index of these superelastic alloy micro-pillars of the invention is more than double that of the corresponding bulk single crystals of Cu—Al—Ni, and well above the merit index of the bulk materials of highest performance. It is discovered that this unexpectedly high damping figure of merit achieved for the micro-structures and nano-structures of the invention is not predicted by corresponding bulk forms of the same material; bulk crystals of the same material do not exhibit this ultra-high-damping property. Accordingly, in one aspect, alloy structures of the invention provided with a micro-scale pillar geometric feature can be characterized by a merit index for mechanical damping that exceeds about 0.5 for the index of Expression (2) above, assuming an optimum combination of stiffness and damping for the pillar geometry.

Structures of the invention include one or more geometric features that are formed of superelastic materials, such as shape memory alloys (SMAs), that are characterized by the formation of a martensitic phase within the alloy material in response to the application of mechanical stress at or above a critical phase transformation stress, $\sigma_c$, that is characteristic for the material in the selected structure shape and at the particular temperature of stress application. The materials employed in accordance with the invention exhibit true superelastic transformation properties, i.e., return to a starting state of strain at the end of a full stress-strain transformation cycle like that of FIG. 1A. The stress-strain plot of FIG. 1B exhibits the hysteresis in strain that is indicative of this reversible, stress-induced, austenite-to-martensite-to-austenite transformation cycle required by the invention.

Table I below is a listing of example materials that can be employed in the superelastic geometric features of the structures of the invention. This table is not exhaustive and is not limiting; it is recognized that other known materials and materials to be discovered can also perform as required by the invention. The invention is not limited to a particular material but rather to a class of materials that in the structure arrangement of the invention exhibit the ultra-high damping properties of the invention.

TABLE I

| Alloy | Composition (atomic %) | Structure Change or Crystal structure of Martensite |
|---|---|---|
| Ag—Cd | 44-49 Cd | B2-2H |
| Au—Cd | 46.5-48.0 Cd | B2-2H |
| Au—Cd | 49-50 Cd | B2-trigonal |
| Cu—Zn | 38.5-41.5 Zn | B2-M (modified) 9R |
| Cu—Zn—X X = Si, Sn, Al, Ga | A few at % | B2-M9R |
| Cu—Al—Ni | 28-29 Al, 3.0-4.5 Ni | DO$_3$-2H |
| Cu—Al—Mn | 16-18 Al, 9-13 Mn | L2$_1$-18R |
| Cu—Au—Zn | 23-28 Au, 45-47 Zn | Heusler-18R |
| Cu—Al—Be | 22-25 Al, 0.5-8 Be | B2-DO$_3$ |
| Ni—Al | 36-38 Al | B2-3R, 7R |
| Ti—Ni | 49-51 Ni | B2 Monoclinic B2-R-phase (monoclinic) |
| Ti—Ni—Cu | 8-20 Cu | B2-orthorombic (monoclinic) |
| Ti—Pd—Ni | 0-40 Ni | B2-orthorhombic (monoclinic) |
| In—Tl | 18-23 Tl | FCC-FCT |
| In—Cd | 4-5 Cd | FCC-FCT |
| Mn—Cd | 5-35-Cd | FCC-FCT |
| Fe—Pt | 25 Pt | BCC or BCT |
| Fe—Ni—Co—Ti | 23 Ni, 10 Co, 10 Ti | BCC or BCT |
| Fe—Ni—Co—Ti | 33 Ni, 10 Co, 4 Ti | BCC or BCT |
| Fe—Ni—Co—Ti | 31 Ni, 10 Co, 3 Ti | BCC or BCT |
| Fe—Ni—C | 31 Ni, .4 C | BCC or BCT |
| Fe—Ni—Nb | 31 Ni, 7 Nb | BCC or BCT |
| Fe—Mn—Si | 30 Mn, 1 Si (single crystal) 28-33 Mn, 4-6 Si | HCP |
| Fe—Cr—Ni—Mn—Si | 9 Cr, 5 Ni, 14 Mn, 6 Si | HCP |
| Fe—Cr—Ni—Mn—Si | 13 Cr, 6 Ni, 8 Mn, 6 Si | HCP |
| Fe—Cr—Ni—Mn—Si | 8 Cr, 5 Ni, 20 Mn, 5 Si | HCP |
| Fe—Cr—Ni—Mn—Si | 12 Cr, 5 Ni, 16 Mn, 5 Si | HCP |
| Fe—Mn—Si—C | 17 Mn, 6 Si, 0.3 C | HCP |
| Fe—Pd | 30 Pd | FCT |
| Fe—Pt | 25 Pt | FCT |

The superelastic materials to be employed in accordance with the invention are crystalline materials, and can be provided in a single crystal or polycrystalline form. For many applications, single crystal material can be preferred. Where the selected material is polycrystalline, the crystalline grains can terminate at grain boundaries or at one or more free surfaces of the structural geometric feature of which they are a part; for many applications, it can be preferred that an individual grain extend to more than one free surface edge. A polycrystalline material is characterized by an average grain size. The grain size of the material can be as large as or larger than a geometric feature of the structure or as large as the whole structure. Herein the term "grain size" is meant to describe the average grain size of both single crystal and polycrystalline materials; for a single crystal material, the grain size of the material is by definition as large as the whole structure.

For polycrystalline materials, the grain size is required by the invention to meet limits relative to the structure size. Whatever geometry and configuration is selected for a structure in accordance with the invention, the grain size of the material of the structure is required in general to be at least the same extent, and preferably larger than, the extent of the smallest superelastic alloy geometrical feature of the structure. In other words, the smallest superelastic alloy geometrical feature of the structure is no larger than the grain size of the material.

Figure 3A:
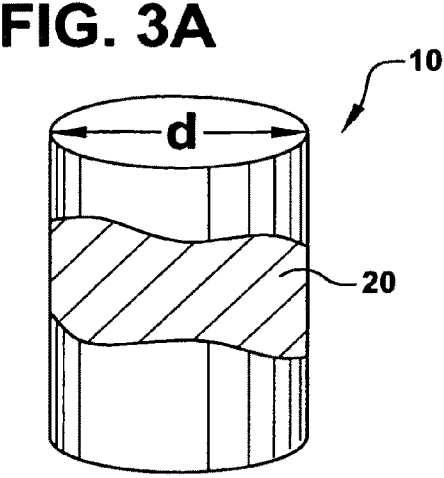
FIGS. 3A-3E are schematic views of an example superelastic alloy micro-pillar, wire or fiber, planar structure, open-cell foam shape, and tube, respectively, provided by the invention.

Turning to example structures that demonstrate this geometrical feature size requirement, there is shown in FIG. 3A a superelastic pillar structure 10 like that depicted in FIG. 1A. The pillar 10 is characterized by a diameter, d, that is the smallest geometrical feature of the pillar; i.e., the diameter is much less than the pillar height. The pillar diameter, d, is no larger than the extent of a polycrystalline grain 20 of the pillar material. As a result, grains 20 span the entire pillar diameter. A second example is shown in FIG. 3B, illustrating a superelastic alloy fiber or wire 25. The wire is characterized by a diameter, d, that is the smallest geometrical feature of the wire, being much smaller than the length of the wire, and that is no larger than the extent of a polycrystalline grain 20 of the wire. As a result, grains 20 span the entire wire diameter. As shown in FIG. 3B, this arrangement results in a so-called bamboo wire structure in which grains generally spanning the diameter of the wire are configured along the length of the wire.

Figure 3E:
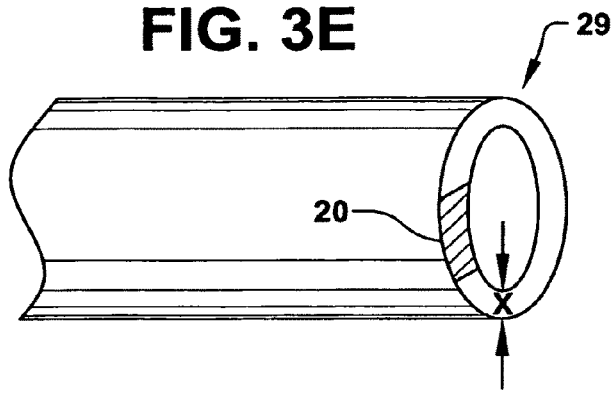
Figure 3B:
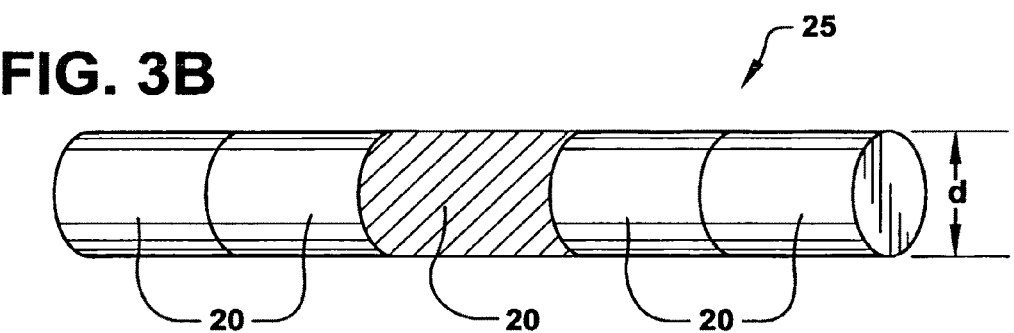
Figure 3C:
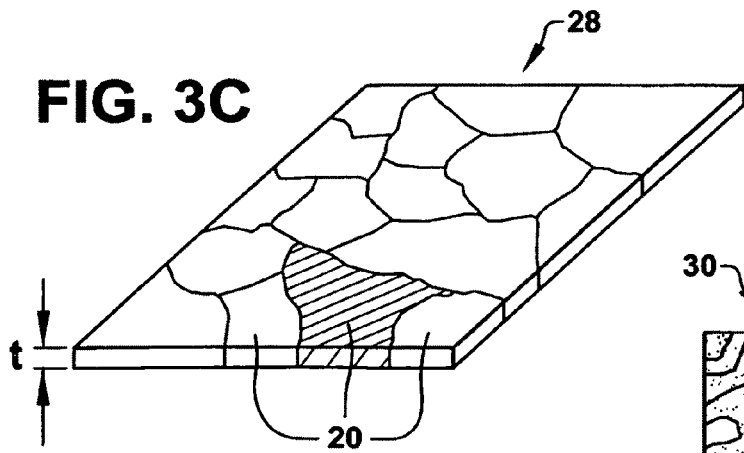

Turning to FIG. 3C, there is shown an example of a structure provided by the invention in the configuration of a superelastic alloy film, a layer, or a planar structure 28. The planar structure 28 is characterized by a thickness, t, that is the smallest geometrical feature of the structure, being much smaller than the width or length of the planar structure. This thickness of the planar structure is no larger than the extent of a grain 20 of the structure, whereby grains generally span the entire thickness of the structure.

Figure 3D:
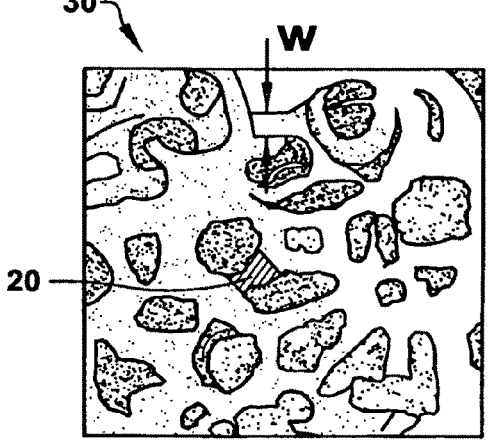

In FIG. 3D there is shown a further example of a structure provided by the invention, here in the configuration of superelastic alloy open cell foam 30 having struts throughout the foam. In accordance with the invention, the span, w, of an individual cell strut is the smallest geometrical feature of the open cell foam, and this span is no larger than the extent of a grain 20 of the structure, whereby grains generally extent across the entire strut span of the foam.

In FIG. 3E, there is shown a further example of a structure provided by the invention, here in the configuration of a superelastic alloy tube 29 having a tube wall thickness, x. In accordance with the invention, the wall thickness, x, of the tube is the smallest geometrical feature of the tube, and this wall thickness is no larger than the extent of a grain 20 of the structure, whereby grains generally span the entire thickness of the tube wall.

With these examples, it is demonstrated that the structures of the invention are characterized by at least one superelastic alloy geometrical feature span across which material grains generally extend completely. The spans of other geometric features of a structure, e.g., pillar height, fiber length, film width and length, or other feature, are not limited in size relative to material grain extent. It is the span of the smallest superelastic alloy geometrical feature of the structure that preferably is no larger than, and most preferably smaller than, the grain size, such that the material grains can generally extend completely across that smallest feature span.

So long as this size limitation for the smallest superelastic alloy geometrical feature of the structure is met, structures of the invention need not be configured entirely of a single geometry. In other words, a structure of the invention can include more than a tube, plate, pillar, or other geometry in FIG. 3. The geometries of FIG. 3 are presented as examples that demonstrate the aspects of the invention particularly well, but structures of the invention can include additional features and elements and combinations of those elements. Indeed, structures of the invention can generally include any number of geometric features and arrangements of such features. In addition, structures of the invention can include a superelastic material portion and/or include one or more geometric features of superelastic materials, without requiring the entire structure to be formed of a superelastic material. Structures of the invention can include several distinct geometric features, of various dimensions and configurations, of one or more superelastic materials. Whatever structural arrangement is employed, the smallest feature of superelastic alloy is specified to have an extent that is no larger than the grain size of the superelastic material. In this case the grains generally span the extent of the smallest feature of the superelastic alloy.

Accordingly, the invention is not limited to a particular structure configuration, arrangement, or geometry. Structures including pillars, wires, fibers, beams, cantilevers, bridges, films, membranes, ribbons, tapes, plates, open- or closed-cell foams, or other selected geometry and combination of geometries, can be employed. The invention is not limited to a particular structure arrangement and instead contemplates the class of structures that provide the required geometrical features and materials to demonstrate the ultra-high damping characteristics of the invention.

In one embodiment, structures of the invention are further characterized by at least one superelastic alloy geometrical feature having an extent that is less than the extent of a phase domain produced by a transformation of the corresponding bulk material from austenite to martensite. With this requirement, one or more martensite domains extend completely across the alloy structure feature. An example of this configuration is shown with the pillar of FIG. 1A. The pillar diameter is in this example the feature having an extent that is less than the extent of a martensite domain. As shown in FIG. 1, in the second state (II) martensite domains 14 begin to form in the pillar in response to an applied mechanical stress 12. The martensite domains extend fully across the diameter of the pillar. As more martensite domains 14 are formed, as in the third state (III) of FIG. 1A, these additional domains also extend fully across the diameter of the pillar.

With this configuration, martensite domains extend across a structure feature to reach one or more free surfaces of the structure. Such is the case for the examples shown in FIGS. 3A-3E. For a martensitic domain that extends fully across the diameter, d, of a pillar 10, the domain reaches the longitudinal sidewall of the pillar. Similarly, for a martensitic domain that extends fully across the diameter, d, of a fiber or wire 25, the domain reaches the longitudinal sidewall of the wire. For a martensitic domain that extends fully across the thickness, t, of a planar structure 28, the domain reaches the planar faces of the structure. For a martensitic domain that extends fully across the width, w, of a foam strut, the domain reaches the edges of the strut. For a martensitic domain that extends fully across the width, x, of a tube, the domain reaches the inner and outer edges of the tube wall.

In addition to these relative feature size requirements, in accordance with the invention there are further imposed absolute geometrical feature size requirements for structures of the invention. In one embodiment, for any structure geometry, configuration, arrangement, and combination of materials, the smallest superelastic alloy geometrical feature of the structure is required by the invention to be no more than about 200 microns in extent, and preferably less than 100 microns in extent. In a second embodiment, the smallest feature of the structure is required by the invention to be no more than about 200 microns in extent and greater than about 2 microns in extent. In a further embodiment, the smallest structure feature size is required to be less than about 1 mm, and can be less than about 200 microns in extent, less than about 50 microns in extent, less than about 10 microns in extent, and less than about 1 micron in extent. In a further embodiment, the smallest structure feature size can be between about 0.5 micron-200 micron in extent.

In accordance with another aspect of the invention, the superelastic alloy geometrical feature size is also selected based on the magnitude of mechanical force that is required to be applied to the structure to cause martensitic phase transformation for a selected structure material. As explained above, superelastic alloys of the invention begin transformation from an austenitic phase to a martensitic phase once a critical mechanical stress, $\sigma_c$, that is characteristic of the alloy, is reached in a structure of the alloy. During application of mechanical stress to a superelastic alloy structure, this critical stress must be reached before the concentration of stress locally at the point of stress application produces plastic deformation of the austenitic phase of the structure. In other words, local plastic deformation of a structure is preferably prohibited as stress applied to the structure is increased to trigger stress-induced martensite phase formation and growth through the structure.

As a result, for a selected superelastic alloy material, the structure feature at which an external mechanical load is to be applied is preferably designed to be small enough to transform from austenite to martensite before the austenite is plastically deformed by the applied force. This condition is obtained by guaranteeing that the load required to be applied to the feature for martensite formation is sufficiently lower than the yield point for plastic deformation of the austenitic phase of the material, at the point of force application at the structure.

For example, referring again to FIG. 1A, in application of mechanical stress 12 to a pillar 10 locally at the top of the pillar, as indicated by the stress arrow 12, local plastic deformation can be induced at the top surface of the pillar at the site of stress application. To avoid such a condition, and thereby to maintain superelasticity of the structure, the structure feature size is selected in concert with the structure material composition to assure that plastic deformation of the structure is prohibited while the applied stress is increased to the critical stress magnitude required for martensite formation.

With structures of the invention configured to include one or more superelastic alloy geometric features having dimensions selected based on the considerations given above, the inventors herein have discovered that the structures of the invention demonstrate unexpected energy dissipation levels that enable the very high damping figure of merit given in the plot of FIG. 2 for micro-pillars of the invention. Two aspects of the austenite-martensite-austenite transformation of structures of the invention are understood to result in this high figure of merit. First, during stress application, the critical stress, $\sigma_c$, at which a structure of the invention begins martensitic transformation, is higher than the critical stress required for macroscopic samples of the same composition and at the same temperature to begin the martensitic transformation.

This increase in the required critical stress of structures of the invention corresponds effectively to stabilization of the austenite phase in the structures of the invention. Without being bound to theory, it is understood that this is enabled in structures of the invention because the structure design results in a paucity of nucleation points for martensite, which usually lie at grain boundaries, other microstructural features, or stress-concentrating surface defects. With the smallest superelastic alloy geometric feature of the structures being less than a grain extent, so that there is substantially no microstructure, and no grain boundaries specifically, per se across the geometrical feature extent, and with mechanical stress applied without stress-concentrating sites, martensite nucleation points are suppressed within the structure.

In bulk alloys, martensite is also known to nucleate on dislocation cores. With structure feature spans that are small enough to accommodate ease of dislocation glide to and escape at a structure surface, such dislocation sites of nucleation are also suppressed. Thus, it is found in accordance with the invention that upon mechanical loading of a structure of the invention, there are few low-stress nucleation sites for martensite, and the mechanical stresses that can be imposed on the structure before the transformation to martensite occurs is much larger than that of corresponding bulk materials.

The second aspect of the transformation cycle that enables a high damping figure of merit in structures of the invention is a complementary effect of scale on the reverse transformation from martensite to austenite upon stress unloading. It is discovered that for structures of the invention, this transformation occurs at an applied load magnitude that is much less than would be expected for such structures. In a bulk superelastic alloy, when the martensitic transformation is stress-induced, the mechanical compression of the martensitic phase of the material furnishes the driving energy to create phase interfaces and revert back to the austenitic phase. The mechanical compression of the martensitic phase also produces stored elastic energy, associated with shape and volume accommodation between the phases, as martensite forms in lath-like structures with a characteristic length of between about 5 µm and about 200 µm. In macroscopic samples, it is this stored elastic energy that promotes the reverse transformation from martensite to austenite as an applied stress is withdrawn.

In contrast, in structures of the invention, martensite variants span an entire structure feature, relieving the stored elastic energy of the martensite domains at one or more free surfaces of the structure rather than enhancing a tendency to transform to austenite. The stability of the martensitic phase of structures of the invention is therefore increased and the reverse transformation to austenite occurs only when a very low value of the applied stress is reached during withdrawal of applied stress from the structures.

As a consequence of both stabilization of austenite in structures of the invention by geometrically eliminating martensite nucleation sites, and improved stability of martensite in structures of the invention due to relaxation effects at a free surface, the martensitic transformation stress of the structures is very high, the austenitic transformation stress is very low, and the stress-strain and load-displacement curves that are characteristic of structures of the invention exhibit very large hysteresis and correspondingly very large damping figures of merit.

As explained above, in achievement of this unexpectedly high damping figure of merit, a structure of the invention is configured such that martensite is formed cross-wise spanning a superelastic alloy geometric feature meeting the dimensional requirements given above. Although martensitic transformation proceeds by a shear mechanism and thus can locally be induced by a shear stress on the microscopic scale, there is no requirement for the form of load applied macroscopically to a structure of the invention nor requirement of the location on the structure at which an external load is applied to obtain the superior mechanical damping properties of the invention. For example, the mechanical damping capabilities of the pillar of FIG. 3A, fibers or wires of FIG. 3B, thin films in FIG. 3C, open cell foam of FIG. 3D, and tube of FIG. 3E can be achieved under conditions of traction, compression, torsion, bending, impact, the force of gravity, or other selected applied force. Under all these various load modes, the martensite plates of the superelastic alloy geometric features having the requisite dimensions given above entirely span these features structures. As a result, the structures of the invention are applicable for a wide range of mechanical input conditions and are not limited to a particular input configuration.

Figure 4A:
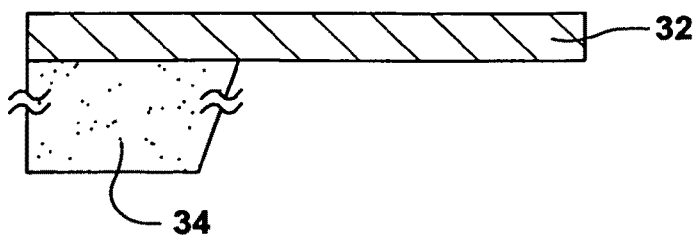
FIGS. 4A-4E are schematic views of an example superelastic alloy cantilever, membrane, bridge, ribbon, and vertical wall, respectively, provided by the invention.
Figure 4B:
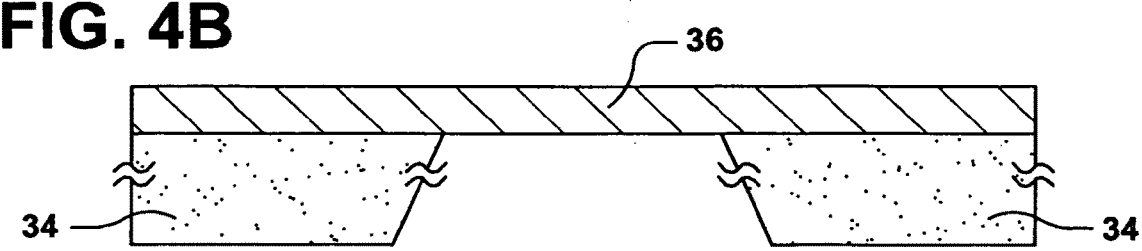
Figure 4C:
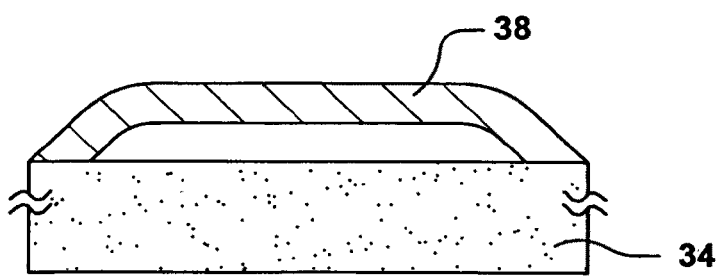
Figure 4D:
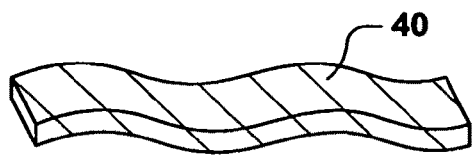
Figure 4E:
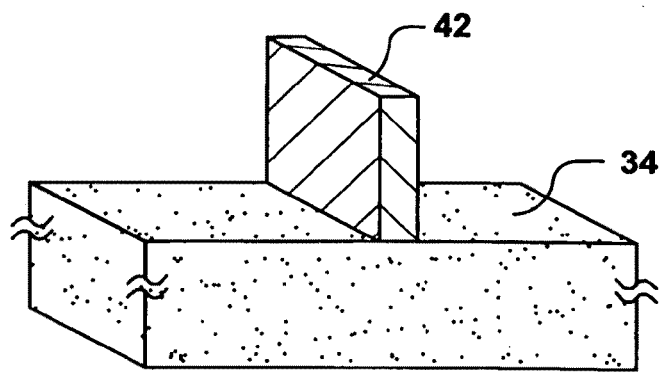

Thus, structures of the invention can be configured with a range of superelastic alloy structural elements in any suitable manner to produce a desired structure arrangement for a given application. For example, referring to FIG. 4A, a planar alloy structure can be configured as a cantilever beam 32 supported on a substrate 34. As shown in FIG. 4B, a planar alloy structure can be configured as a free standing plate or membrane 36 supported at the membrane edges by a substrate 34. Alternatively, an arching bridge-like alloy surface structure 38 can be provided on a support or substrate 34. Other configurations, like that in FIG. 4D, such as an alloy ribbon 40 that is free to be disposed or incorporated into a structure, can be produced in a structure of the invention. Referring to FIG. 4E, a planar alloy structure 42 can also be arranged vertically relative to a substrate 34 or other structure in configuring a structure of the invention. As explained above, in general, in constructing such structures, structural elements and geometrical features that are not superelastic can be included and incorporated into the structure in accordance with the invention. Such non-superelastic elements can be in contact with or connected to the superelastic alloy in any suitable configuration that enables phase transformation of the superelastic alloy. In addition, two or more distinct superelastic alloy features can be included in the structural configuration.

Figure 5A:
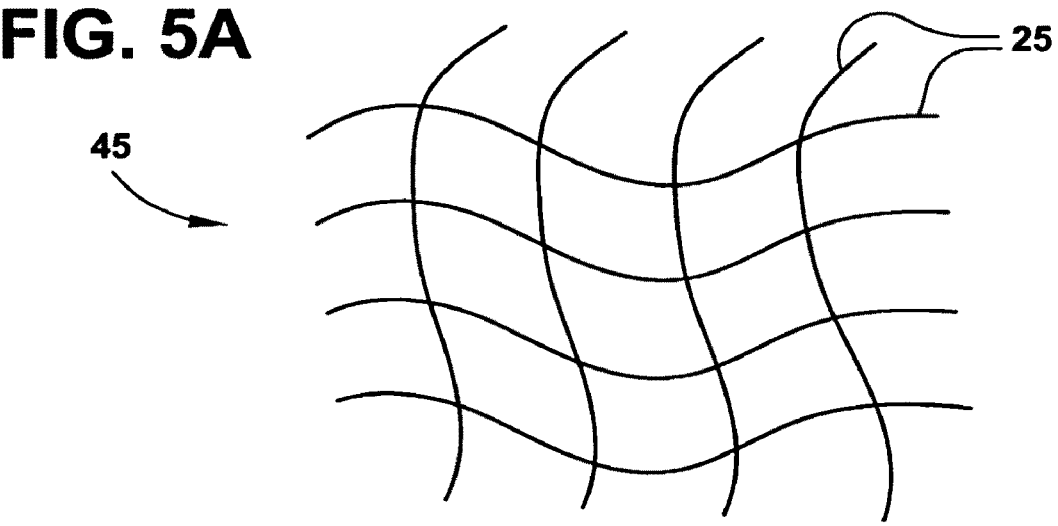
FIGS. 5A-5C are schematic views of an example weave of superelastic alloy fibers, bundle of superelastic alloy fibers, and braid of superelastic alloy fibers, respectively, provided by the invention.
Figure 5B:
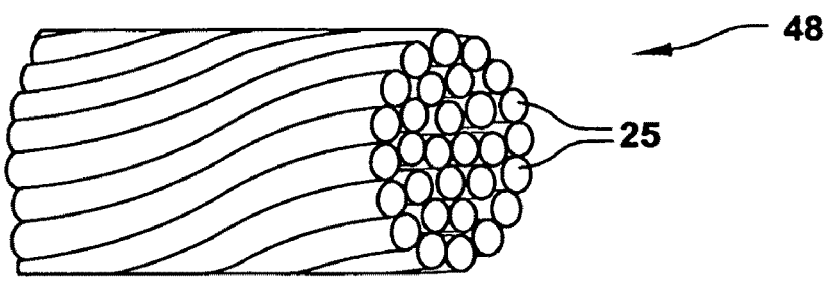
Figure 5C:
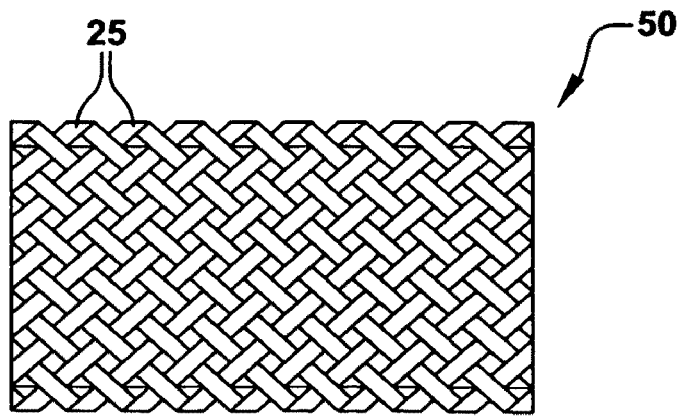

Superelastic alloy fibers or wires of the invention can similarly be configured in any suitable arrangement for a selected structure configuration and application. Referring to FIG. 5A, superelastic alloy wire or fiber 25 of the invention can be woven into a fiber sheet 45 to form a selected structure that can be employed as a fiber textile in the manner of fabric. Such alloy wires or fibers can be bundled, as shown in FIG. 5B, in a bundle 48 of fibers 25 that are twisted, braided, or otherwise configured within the bundle for a selected application, including coaxial arrangements. As shown in FIG. 5C, fibers or wires 25 can be braided in a braiding configuration 50 for producing a braided sheet, tube or other configuration of wires or fibers. In such structures comprising more than one individual wire or fiber, one or more of the fibers or wires can be superelastic alloys, with one or more non-superelastic fibers or wires included in the braid or weave. Alternatively, all of the fibers or wires in the structure can be of one or more superelastic alloy compositions.

Figure 6A:
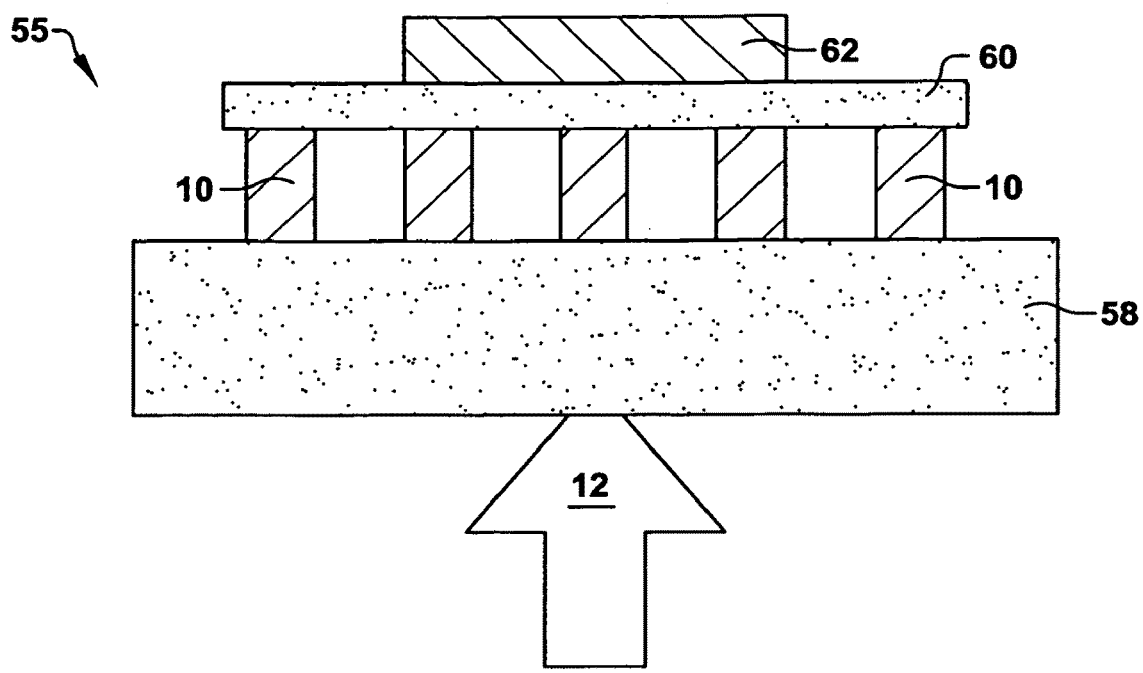
FIG. 6A is a schematic view of a mechanical system including an array of micro-pillars for mechanical vibration damping in accordance with the invention.

In accordance with the invention, superelastic alloy structures of the invention can be arranged in applications for absorbing mechanical shock, for suppressing mechanical vibration, and dissipating mechanical energy from mechanical and electromechanical systems both for macro-scale as well as micro-scale and nano-scale applications. Referring to FIG. 6A, in one example configuration, there is provided a vibration suppression system 55 including an array of pillar structures 10 of the invention. The array of pillars 10 is provided on a mechanical support 58 that is configured to accept a mechanical input 12 that includes mechanical force and vibration, e.g., by interface to a moving structure or other ambient condition. The array of pillars 10 are configured on the mechanical support 58 on a side opposite the mechanical input and are connected to, e.g., a platform 60 on which is provided a mechanical system 62, e.g., a MEMS structure or apparatus. As mechanical force 12 is input at the support 58, the pillar structures 10 repeatedly cycle through austenitic-martensitic transformations, damping mechanical vibrations to mechanically isolate the MEMS apparatus from the mechanical input. Note that no active control or energy input is required to achieve this actuation of the pillar structures in their damping role; the actuation is completely automatic and self-controlled.

Figure 6B:
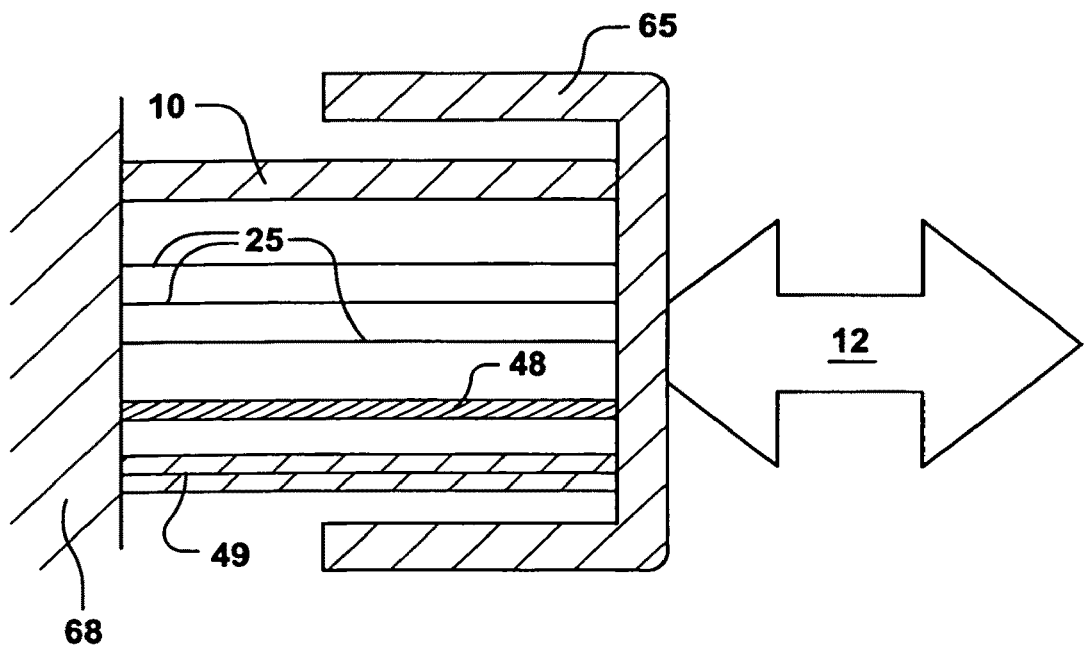
FIG. 6B is a schematic view of a mechanical system including a housing having a superelastic alloy micro-pillar, superelastic alloy fibers, a bundle of superelastic alloy fibers, and a cable of superelastic alloy fibers, in accordance with the invention for mechanical vibration damping.

Referring to FIG. 6B, superelastic alloy wire and fiber of the invention can similarly be configured for mechanical shock absorption and vibration damping. In this example a housing 65 is provided for accepting mechanical input 12, shown here for application of tension to the housing, if such is desired for a given configuration. The housing 65 is connected to a mechanical support 68 through one or more superelastic alloy structures of the invention; here a range of structures are shown for illustrative example. For example, one or more structure pillars 10, fibers or wires 25, bundles 48 of fibers or wires, and cables 49 or braids of fibers or wires can be connected between the mechanical housing and the mechanical support. As mechanical stress 12, e.g., tension, is input to the housing, all of the superelastic alloy structures cycle through austenite-martensite-austenite transformations, damping vibration and absorbing shock energy input to the housing. Note again that no active control or energy input is required to achieve this mechanical damping; the structures of the invention actuate automatically to dissipate energy between the housing 65 and the mechanical support 68.

Turning now to techniques provided by the invention for producing the superelastic alloy structures of the invention, superelastic alloy fibers or wires can be produced by any suitable method, including, e.g., Taylor wire hot drawing, swaging, rolling, extrusion, pultrusion, solid-state wire drawing and the like. Whatever fiber production process is employed, it is preferred in accordance with the invention that the resulting superelastic fiber be arranged to have a bamboo-type microstructure along the length of the fiber, meaning that the boundaries between grains of the fiber generally span the fiber diameter, as shown for the fiber 25 of FIG. 3B. This bamboo microstructure reduces the number of grain boundary junctions in the material, which can be preferential sites for fracture. Such fracture is common for many polycrystalline shape memory alloys, which are characteristically quite brittle, and can result in intergranular fracture from grain displacement during phase transformations, due, e.g., to stress concentrations at grain boundaries and grain boundary junctions. The bamboo fiber microstructure of the invention can limit such intergranular fracture and also provides material properties that approach that of a single crystal alloy without requiring the complexity of single crystal structure fabrication.

In one well-suited process, superelastic alloy fibers of the invention are produced by Taylor wire hot drawing. In this process, a selected superelastic alloy material is melted and provided in a glass tube, from which the fiber is drawn with mechanical action, at a uniform drawing speed. The fiber is drawn with a low vacuum or inert gas atmosphere inside the tube to suppress oxidation of the molten alloy as the fiber is drawn. The fiber is cooled during the drawing at a cooling rate that is high enough to prohibit fiber deformation as the fiber solidifies and that is low enough to maintain a high-temperature austenite phase. The tube from which the fiber is drawn preferably is formed of a glass that is compatible with the selected alloy material and that is characterized by a drawing temperature that is greater than the alloy melting temperature and less than the alloy boiling temperature, with a viscosity-temperature behavior that allows for quick glass crystallization after the alloy melt solidifies in the tube. Preferably the thermal expansion coefficient of the tube glass is reasonably close to that of the selected alloy to avoid the development of thermal stress during cooling of the alloy melt in the tube.

In one example Taylor wire hot drawing process provided by the invention, a selected alloy, e.g., a CuAlNi alloy, is melted and drawn from a Borosilicate Pyrex glass tube of about 4 mm inner diameter, at a draw temperature of between about, e.g., 1100° C.-1150° C., with a draw speed selected to produce a selected fiber diameter; the faster the draw speed, the smaller the fiber diameter. For example, a drawing speed of about 3-4 meters/second is sufficient to produce a fiber with a diameter of about 20 microns. Once a fiber of a selected diameter is drawn from a glass tube, preferably the fiber is annealed at a selected temperature that is much higher than the eutectoid temperature and lower than the liquidus temperature, e.g., preferably between about 850° C. and 950° C. for the example CuAlNi alloy, and for a suitable duration, e.g., 1-3 hours, depending on the structure dimensions, and then quenched in cold water. This annealing-quenching process imparts the bamboo microstructure of grains along the fiber length and encourages the formation of the high-temperature austenite phase.

It is recognized that a range of production techniques can be employed to form superelastic alloy fibers and wires, and the invention is not limited to a particular production technique. Fibers and wires can be formed by, e.g., mechanical swaging, solid-state drawing, extrusion, pultrusion, microcasting, or other selected techniques. Whatever technique is employed, it is preferred that such produces a bamboo microstructure of grains generally spanning the fiber diameter along the fiber length if the fiber is polycrystalline.

Other superelastic alloy structures of the invention are manufactured by any selected process that produces the structure geometry and material composition required for a given application. Superelastic alloy films, plates, and planar structures can be produced by, e.g., magnetron sputtering, vapor deposition methods, vacuum deposition methods, electrodeposition, or other selected process material deposition process. Whatever process is employed to form a film, plate, or planar structure, in accordance with the invention the structure can be processed with a post-deposition annealing cycle to form polycrystalline grains of the proper austenitic phase that are equal to or greater than the film, plate, or structure thickness. Open cell foams with struts of alloy can be formed by infiltration of a melt into a preform followed by chemical leaching out of the preform. In all cases, the grain size is equal to or greater than the extent of the smallest feature of the structure.

Turning to other structure fabrication processes, bulk micromachining and surface micromachining, such as wet and dry etching, as well as material deposition, can be employed for producing substrate and other support structures, and for integrating a selected superelastic alloy feature or features with other structure components. Where a superelastic alloy structure is to be formed from a bulk single crystal alloy, focused ion beam (FIB) micromachining, or other machining or etching technique can be employed to form a structure, such as a micro-pillar, from the surface of a section of a bulk single crystal. Superelastic alloy structure features can also be manually aligned and placed in a selected arrangement with a substrate or other support structure and with other structure components or mechanical system components like those in the systems of FIGS. 6A-6B.

EXAMPLE I

A superelastic alloy composition of Cu 81.3 wt %-Al 13.7 wt %-Ni 5 wt %, having a melting temperature of about 1100° C., was produced in melt form and drawn into superelastic alloy fibers of varying diameters. The fibers were produced by Taylor wire hot drawing through a glass tube of Borosilicate Pyrex glass of 80.6 wt % $SiO_2$, 12.6 wt % $B_2O_3$, 4.2 wt % $Na_2O$, and 2.2 wt % $Al_2O_3$, having a softening temperature of about 820° C., a working temperature of about 1200° C. and an inner diameter of about 4 mm. The fibers were drawn at a temperature above the melting point in a low vacuum. Thirteen different fiber diameters were achieved ranging from about 450 microns in diameter to about 20 microns in diameter, with draw speeds ranging between about 1-4 m/s. Once drawn, the fibers were annealed at a temperature of about 850° C. in an argon atmosphere for about one hour and then quenched in cold water to impart a bamboo microstructure to the fibers. Afterwards, the glass coating on the fibers was removed by immersing the fibers in 10% hydrogen fluoride (HF) aqueous solution for about 10-15 hours, avoiding surface pitting of the fibers.

Uniaxial tensile tests were performed for all fibers using a TA Instruments Q800 Dynamic Mechanical Analyzer. In the tests, a fiber was placed vertically, being attached to a fixed clamp at the top and to a movable clamp at the bottom. A uniaxial tensile force was applied to the movable bottom clamp at a constant rate to deform the fiber. The rate at which the force was increased and decreased was not critical for measuring the superelasticity and damping properties here, as the austenite-martensite transformation in the fibers took place very quickly and so was found to be nominally rate-independent for the rates accessible by the testing equipment. The elongation of a fiber was measured by a high-resolution linear optical encoder below the movable bottom clamp. Therefore the entire part of the fiber that was between the top and bottom clamps is equivalent to the gauge length in traditional tensile tests of macro-scale or bulk samples. The entire clamp, with the loaded fiber in the middle, was encapsulated in a small, bifilar wound furnace, which, combined with a gas cooling accessory, provided precise temperature control for the isothermal tests at a temperature of between about 30° C. and about 100° C.

For each transformation cycle tested for each fiber, the critical stress above which martensite domains began to form was noted and the critical stress below which austenite morphology began to return was noted. The difference in stress, $\Delta\sigma$, between the martensite critical stress value, $\sigma_M$, and the austenite critical stress value, $\sigma_A$, is accordingly herein termed $\Delta\sigma = \sigma_M - \sigma_A$.

Figure 7A:
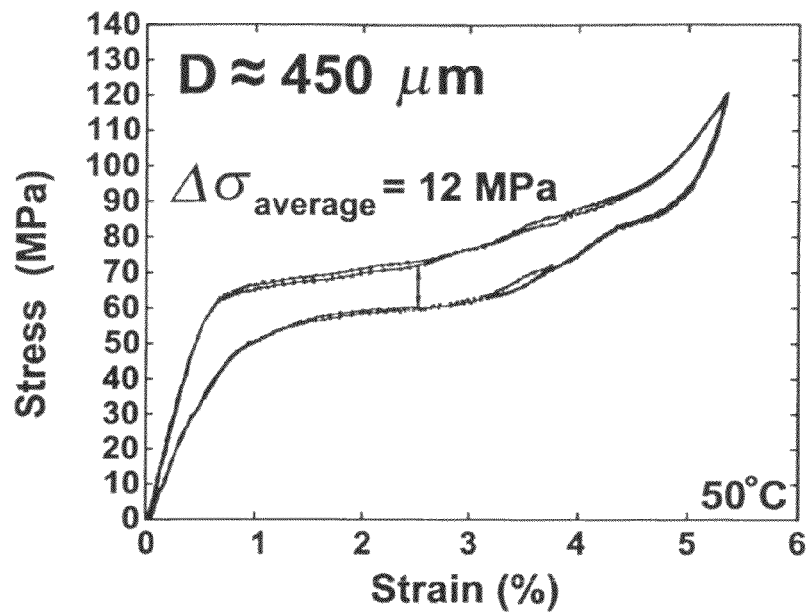
FIG. 7A is a plot of applied stress and measured strain for an experimental superelastic alloy fiber of the invention having a diameter of about 450 μm.
Figure 7B:
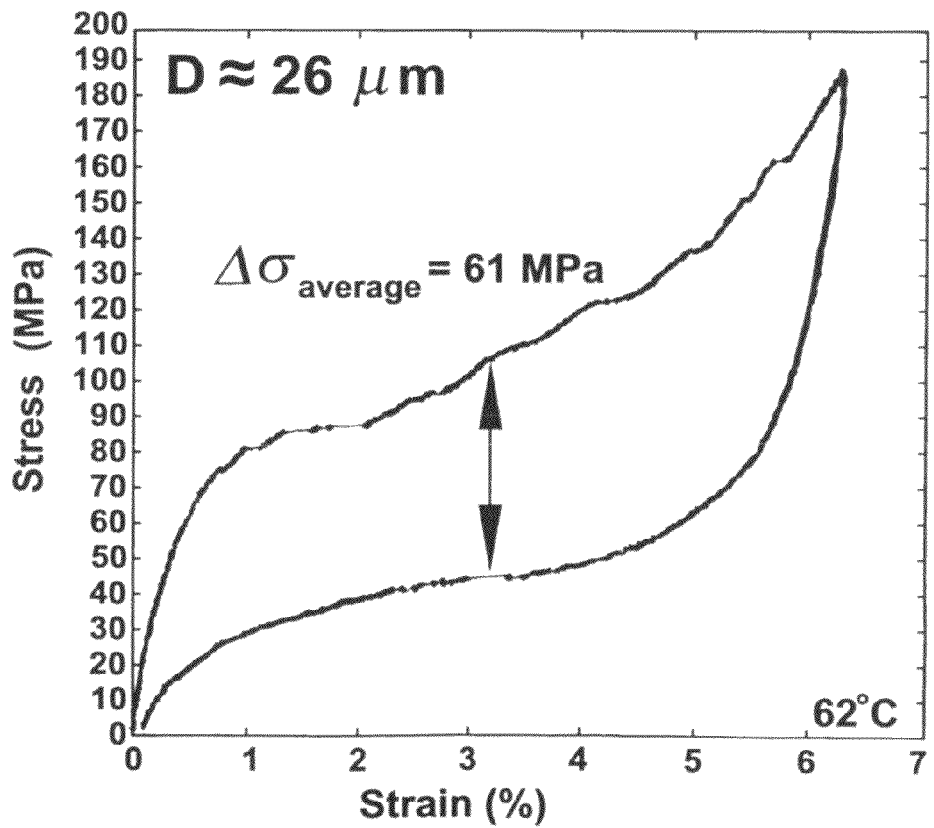
FIG. 7B is a plot of applied stress and measured strain for an experimental superelastic alloy fiber of the invention having a diameter of about 26 μm.

FIGS. 7A-7B are plots of measured stress-strain data for two of the alloy fibers, namely, a fiber having a diameter of about 450 μm and a fiber having a diameter of about 26 μm, respectively, tested as given above. As shown in the plot of FIG. 7A, the average difference in critical stresses, $\Delta\sigma$, between the martensite critical stress value, $\sigma_M$, and the austenite critical stress value, $\sigma_A$, is about 12 MPa for the 450 μm-diameter fiber. As shown in the plot of FIG. 7B, the average difference in critical stresses, $\Delta\sigma$, between the martensite critical stress value, $\sigma_M$, and the austenite critical stress value, $\sigma_A$, is found to be about 61 MPa for the 26 μm-diameter fiber.

This average difference in critical stresses was calculated for each stress-strain hysteresis cycle measured for the thirteen experimental fibers. FIGS. 8A-8C are linear plots of the average difference in critical stresses, $\Delta\sigma$, for all thirteen experimental fibers, at three temperatures, T, namely, $T=A_f$, the temperature at or above which martensite can be fully reversed back to austenite after removal of the load, $T=A_f+10°$ C., and $T=A_f+20°$ C., respectively. FIG. 8D is a logarithmic plot of the values of the plot of FIG. 8B, further including the value of the measured difference in critical stresses for a conventional alloy rod of 3000 μm in diameter, as described by Otsuka et al., *Acta Metallurgica*, Volume 24, pp. 207-226, 1976, shown with a triangle. The value of the measured difference in critical stresses for two experimental micro-pillars produced in accordance with the invention, as described in the Example II below, are shown in this plot with squares.

It was discovered by the inventors that the difference in critical stresses, $\Delta\sigma$, was unexpectedly dramatically high, with values of at least about 20 MPa, for the superelastic alloy fibers that had a diameter of 200 μm or less. As shown in the logarithmic plot of FIG. 8D, these high values fall along a straight line relationship between the difference in critical stresses, $\Delta\sigma$, and fiber diameter. The conventional fiber, having a diameter of 3000 μm, shows a levelling off of difference in critical stresses, $\Delta\sigma$, that generally corresponds to conventional macro-scale materials. This result demonstrates that the structures of the invention display a dramatic increase in energy dissipation, during an austenite-martensite transformation cycle, over conventional bulk and macro-scale superelastic alloy configurations.

EXAMPLE II oriented single crystals of the Cu—Al—Ni alloy Cu-13.7Al-5Ni (wt %) were characterized. This alloy exhibits transformation temperatures of $M_s$=291 K, $M_f$=273 K, $A_s$=285 K and $A_f$=303 K, corresponding to the temperatures of the martensitic phase start and finish and the austenitic phase start and finish, respectively. This alloy is in the austenitic phase (cubic) at room temperature and consequently is susceptible to stress-induced transformation to β' martensite (monoclinic).

Micro- and nano-scale pillars of the alloy were produced by focused ion beam (FIB) micromachining with a FEI Dual Beam DB235 instrument. Each pillar was machined from the surface of sections cut from bulk Cu—Al—Ni [001] single crystals. Micro-compression tests were then performed on the pillars by instrumented nano-indentation with a Hysitron Triboindenter and using a sphero-conical diamond indenter tip of 0.6 μm in radius. One example experimental micro-pillar exhibited a slightly tapered shape with a diameter of about 0.750 μm at the top, a mean diameter of about 0.900 μm, and a height of about 3.8 μm.

Nano compression tests were performed on this experimental micro-pillar. After carefully positioning the apex of the indenter over the pillar, a multiple-cycle compression test was carried out up to a maximum load of 120 μN at a loading-unloading rate of 250 μN/s, corresponding to a cycling frequency of about 1 Hz.

Figure 9A:
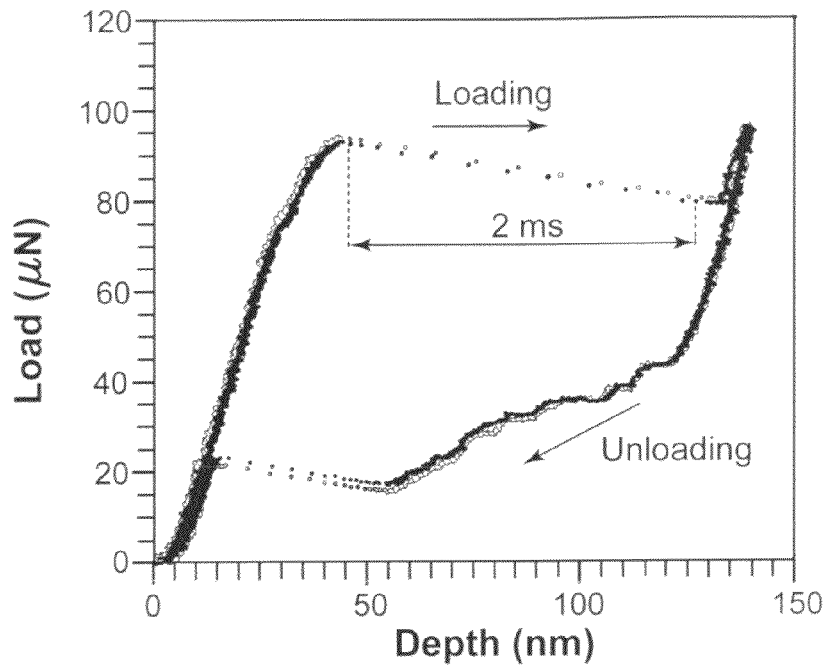
FIG. 9A is a plot of deflection depth as a function of applied stress for a superelastic alloy micro-pillar of the invention of 0.9 micron-diameter, for two austenitic-martensitic-austenitic transformation cycles.

FIG. 9A is a plot of two load-displacement curves experimentally obtained after 10 compression cycles for the micro-pillar, illustrating the reproducibility of the loading-unloading curves. During loading, at a loading of about 95 μN, a sudden and abrupt burst of displacement of 80 nm (2.2% strain) accumulated in two milliseconds, due to the stress-induced martensitic transformation and the motion of austenite-martensite interfaces. Upon unloading, the reverse transformation initiated at a lower load of about 45 μN, and was complete at a load of about 22 μN. No residual deformation remained after unloading, demonstrating the completely reversible superelasticity of the structures of the invention.

Figure 9B:
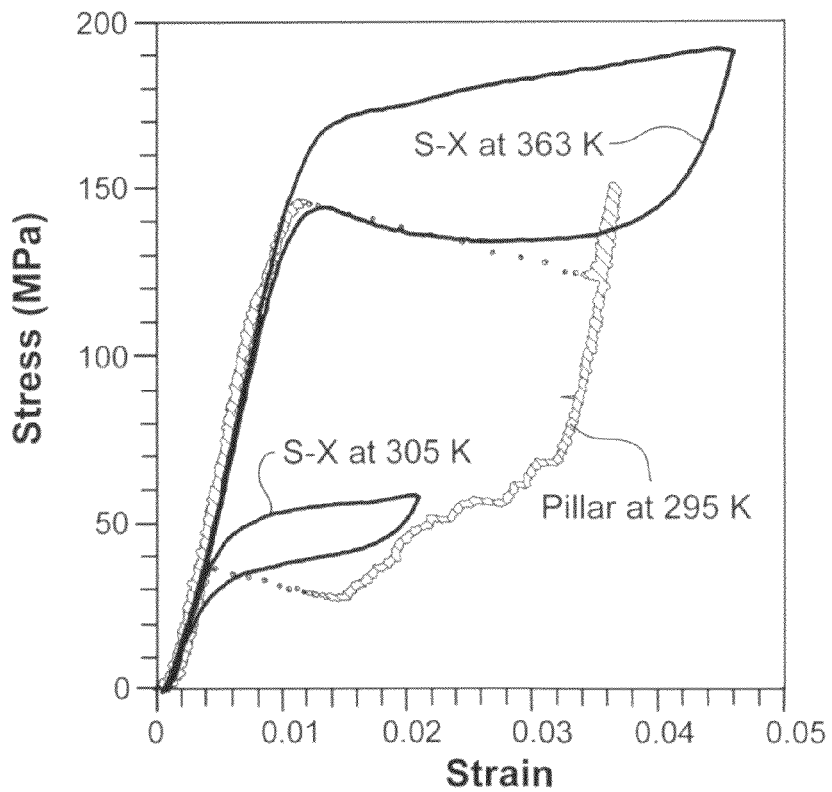
FIG. 9B is a plot of measured strain as a function of applied stress for two bulk superelastic alloy crystals and for a superelastic alloy pillar of the invention.

FIG. 9B is a plot of stress-strain curves for bulk single crystals of Cu-13.7Al-5Ni (wt %) at the two temperatures of 363 K and 305 K, and for a micro-pillar of the invention described just above, at 295 K. Following the Clausius-Clapeyron equation for bulk crystals one would expect a stress strain response at 295 K below that obtained at 305 K with a critical stress $\sigma_c$=17 MPa. However, the micro-pillar exhibits quite different behavior than that prescribed by the macro-scale bulk, with a critical stress almost ten times higher at $\sigma_c$=147 MPa.

The increment of >130 MPa in critical stress indicates an increase in the stability of the austenitic phase, which is equivalent to an expected thermal transformation at 233 K, instead of the measured 291 K for bulk single crystals. This decrease in thermal transformation temperature was experimentally verified by in situ cooling of the micro-pillar in a scanning electron microscope: in this experiment a bulk crystal of Cu-13.7Al-4.5 Ni (wt %) was prepared with a micro-pillar milled into the bulk using a Ga ion gun. A cooling stage of an FEI XL30 SEM was employed. The bulk was massively transformed into martensite at 250 K, as evidenced by the lath structure that was exhibited. But the micro-pillar was not itself transformed.

With this description it is shown that the invention provides a discovery that a very high merit index for damping of the superelastic alloy structures of the invention is unexpected and is enabled by one or more micro-scale or nano-scale geometrical features of the structures. With their ultra-high-damping performance characteristics and response times on the order of just a few milliseconds, structures of the superelastic alloys of the invention, such as the Cu—Al—Ni shape memory alloy described above, provide a practical solution for a new generation of more precise and reliable MEMS and the growing class of nano-scale devices and systems.

It is recognized, of course, that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:

1. A mechanical structure comprising:
a crystalline superelastic alloy characterized by an average grain size and characterized by a martensitic phase transformation resulting from a mechanical stress input greater than a characteristic first critical stress; and
a configuration of the superelastic alloy providing a geometric structural feature of the alloy having an extent that is no greater than about 200 micrometers and that is no larger than the average grain size of the alloy, the geometric feature being characterized by a merit index for mechanical damping, $(1/\pi)E^{1/2}(\Delta W/W_{max})$, that is at least about 0.5, where E is Young's modulus for the alloy feature, $\Delta W$ is dissipated energy per unit volume of the alloy feature for one cycle of phase transformation with the input mechanical stress, and $W_{max}$ is maximum stored mechanical energy per unit volume of the alloy feature for one cycle of phase transformation with the input mechanical stress.

2. The structure of claim 1 wherein the characteristic first critical stress for causing the martensitic phase transformation is less than a plastic deformation stress that would plastically deform the structure.

3. The structure of claim 1 wherein the geometric structural feature extent is less than an extent of a martensitic domain of the superelastic alloy.

4. The structure of claim 1 wherein an individual grain of the alloy extends to more than one free surface edge of the geometric structural feature.

5. The structure of claim 1 wherein the superelastic alloy is further characterized by an austenitic phase transformation resulting from a reduction in mechanical stress input below a characteristic second critical stress, with a difference between the first critical stress and the second critical stress in the geometric structural feature being at least about 20 MPa.

6. The structure of claim 1 wherein the superelastic alloy comprises a shape memory alloy.

7. The structure of claim 1 wherein the superelastic alloy grain structure is monocrystalline.

8. The structure of claim 1 wherein the superelastic alloy grain structure is polycrystalline.

9. The structure of claim 1 wherein the superelastic alloy is characterized by an austenitic phase at room temperature.

10. The structure of claim 1 wherein the superelastic alloy comprises copper.

11. The structure of claim 1 wherein the superelastic alloy comprises aluminum.

12. The structure of claim 1 wherein the superelastic alloy comprises nickel.

13. The structure of claim 1 wherein the geometric structural feature of the alloy has an extent that is greater than about 2 micrometers.

14. The structure of claim 1 wherein the geometric structural feature of the alloy has an extent that is no greater than about 100 micrometers.

15. The structure of claim 1 wherein the geometric structural feature of the alloy has an extent that is no greater than about 50 micrometers.

16. The structure of claim 1 wherein the configuration of the superelastic alloy includes a pillar of the alloy providing the geometric structural feature as a diameter of the pillar.

17. The structure of claim 1 wherein the configuration of the superelastic alloy includes a wire of the alloy providing the geometric structural feature as a diameter of the wire.

18. The structure of claim 17 wherein the wire is characterized by a bamboo grain structure in which grains extend across the wire diameter.

19. The structure of claim 1 wherein the configuration of the superelastic alloy structure includes a ribbon of the alloy providing the geometric structural feature as a thickness of the ribbon.

20. The structure of claim 1 wherein the configuration of the superelastic alloy structure includes a fiber of the alloy providing the geometric structural feature as a diameter of the fiber.

21. The structure of claim 20 wherein the fiber is characterized by a bamboo grain structure in which grains extend across the fiber diameter.

22. The structure of claim 1 wherein the configuration of the superelastic alloy structure includes a cantilever of the alloy providing the geometric structural feature as a thickness of the cantilever.

23. The structure of claim 1 wherein the configuration of the superelastic alloy structure includes a bridge of the alloy providing the geometric structural feature as a thickness of the bridge.

24. The structure of claim 1 wherein the configuration of the superelastic alloy structure includes a membrane of the alloy providing the geometric structural feature as a thickness of the membrane.

25. The structure of claim 1 wherein the configuration of the superelastic alloy structure includes a plate of the alloy providing the geometric structural feature as a thickness of the plate.

26. The structure of claim 1 wherein the configuration of the superelastic alloy structure includes open-cell foam of the alloy providing the geometric structural feature as a span of a strut of the foam.

27. The structure of claim 1 wherein the configuration of the superelastic alloy structure includes closed-cell foam of the alloy providing the geometric structural feature as a thickness of a face of the foam cell.

28. The structure of claim 1 wherein the configuration of the superelastic alloy structure includes a sheet of woven fibers of the alloy providing the geometric structural feature as a diameter of at least one of the fibers.

29. The structure of claim 1 wherein the configuration of the superelastic alloy structure includes a bundle of fibers of the alloy providing the geometric structural feature as a diameter of at least one of the fibers.

30. The structure of claim 1 wherein the configuration of the superelastic alloy structure includes a cable of fibers of the alloy providing the geometric structural feature as a diameter of at least one of the fibers.

31. The structure of claim 1 wherein the configuration of the superelastic alloy structure includes a braid of fibers of the alloy providing the geometric structural feature as a diameter of at least one of the fibers.

32. The structure of claim 1 wherein the geometric structural feature of the alloy is configured to absorb mechanical shock energy from the mechanical stress input.

33. The structure of claim 1 wherein mechanical vibration damping is characterized for the geometric structural feature by a merit index for mechanical damping that is at least about 0.9.

34. The structure of claim 1 wherein mechanical vibration damping is characterized for the geometric structural feature by a mechanical damping coefficient that is greater than about 0.15.

35. A mechanical structure comprising:
a crystalline superelastic alloy characterized by an average grain size and characterized by a martensitic phase transformation resulting from a mechanical stress input greater than a characteristic first critical stress; and
a configuration of the superelastic alloy providing a geometric structural feature of the alloy having an extent that is no greater than about 200 micrometers and that is no larger than the average grain size of the alloy, the geometric feature being configured to damp mechanical vibrations from the mechanical stress input wherein mechanical vibration damping is characterized for the geometric structural feature by a merit index for mechanical damping, $(1/\pi)E^{1/2}(\Delta W/W_{max})$, that is at least about 0.5, where E is Young's modulus for the alloy feature, $\Delta W$ is dissipated energy per unit volume of the alloy feature for one cycle of phase transformation with the input mechanical stress, and $W_{max}$ is maximum stored mechanical energy per unit volume of the alloy feature for one cycle of phase transformation with the input mechanical stress.

36. A mechanical damping system comprising:
a mechanical support through which mechanical stress is input;
a mechanical system; and
a mechanical connection between the mechanical system and the mechanical support provided by at least one crystalline superelastic alloy structure having an average grain size and being characterized by a martensitic phase transformation resulting from a mechanical stress input greater than a characteristic first critical stress, a configuration of the superelastic alloy structure providing a geometric structural feature of the alloy including a structural feature having an extent that is no greater than about 200 micrometers and that is no larger than the average grain size, the geometric structural feature being characterized by a merit index for mechanical damping, $(1/\pi)E^{1/2}(\Delta W/W_{max})$, that is at least about 0.5, where E is Young's modulus for the alloy, $\Delta W$ is dissipated energy per unit volume of the alloy structure for one cycle of phase transformation with the input mechanical stress, and $W_{max}$ is maximum stored mechanical energy per unit volume of the alloy structure for one cycle of phase transformation with the input mechanical stress to accept the input mechanical stress.

37. The mechanical damping system of claim 36 wherein the at least one crystalline superelastic alloy structure comprises an alloy pillar.

38. The mechanical damping system of claim 36 wherein the at least one crystalline superelastic alloy structure comprises an array of alloy pillars.

39. The mechanical damping system of claim 36 wherein the at least one crystalline superelastic alloy structure comprises at least one alloy fiber.

40. The mechanical damping system of claim 36 wherein the at least one crystalline superelastic alloy structure comprises at least one cable of alloy fibers.

41. A mechanical damping system comprising:
a mechanical housing having an input end through which mechanical stress is input;
a mechanical support; and
a mechanical connection between the housing and the support provided by at least one crystalline superelastic alloy structure having an average grain size and being characterized by a martensitic phase transformation resulting from a mechanical stress input greater than a characteristic first critical stress, a configuration of the superelastic alloy structure providing a geometric structural feature of the alloy including a structural feature having an extent that is no greater than about 200 micrometers and that is no larger than the average grain size of the alloy, the geometric structural feature being characterized by a merit index for mechanical damping, $(1/\pi)E^{1/2}(\Delta W/W_{max})$, that is at least about 0.5, where E is Young's modulus for the alloy structure, $\Delta W$ is dissipated energy per unit volume of the alloy structure for one cycle of phase transformation with the input mechanical stress, and $W_{max}$ is maximum stored mechanical energy per unit volume of the alloy structure for one cycle of phase transformation with the input mechanical stress to accept the input mechanical stress.

42. The mechanical damping system of claim 41 wherein the at least one crystalline superelastic alloy structure comprises an alloy pillar.

43. The mechanical damping system of claim 41 wherein the at least one crystalline superelastic alloy structure comprises an array of alloy pillars.

44. The mechanical damping system of claim 41 wherein the at least one crystalline superelastic alloy structure comprises at least one alloy fiber.

45. The mechanical damping system of claim 41 wherein the at least one crystalline superelastic alloy structure comprises at least one cable of alloy fibers.

* * * * *